United States Patent [19]

Miyazaki et al.

[11] Patent Number: 4,794,068

[45] Date of Patent: Dec. 27, 1988

[54] OPTICAL RECORDING MEDIUM

[75] Inventors: Jinsei Miyazaki, Hirakata; Eiji Ando, Katano; Kimiaki Yoshino, Yawata; Kazuhisa Morimoto, Settsu, all of Japan

[73] Assignee: Matsushita Electric Industrial Co., Ltd., Osaka, Japan

[21] Appl. No.: 94,032

[22] Filed: Aug. 31, 1987

Related U.S. Application Data

[63] Continuation of Ser. No. 790,969, Oct. 24, 1985, abandoned.

[30] Foreign Application Priority Data

Oct. 25, 1984 [JP] Japan ................. 59-224413
Oct. 25, 1984 [JP] Japan ................. 59-224415

[51] Int. Cl.$^4$ ............................. G03C 1/733
[52] U.S. Cl. ...................... 430/345; 430/19; 430/21; 430/962; 430/495; 430/270
[58] Field of Search ............. 430/19, 337, 345, 962, 430/21, 270, 495; 549/330, 331

[56] References Cited

U.S. PATENT DOCUMENTS 3,355,293 11/1967 Foris ..................... 430/962
4,405,733 9/1983 Williams et al. ............. 430/345

OTHER PUBLICATIONS

Cabrera et al—"Photocontraction of Liquid Spiropyran–Merocyanine Films," Science, vol. 226, Oct. 19, 1984, pp. 341–343.
Vollmer, Chem Abstr., vol. 84, No. 82505q (1986).
Bartolini et al., Optical Engineering, vol. 15, No. 2 (1976), pp. 99–108.

Primary Examiner—Won H. Louie
Attorney, Agent, or Firm—Wenderoth, Lind & Ponack

[57] ABSTRACT

An optical recording medium is prepared by the use of spiropyrane whose molecular structure contains an alkyl chain having at least 10 more carbon atoms, and by the use of an LB film method or a spin coating method. This recording medium is of a structure wherein when irradiated with the UV, the spiropyrane is photo-isomerized to photomerocyane and, thereafter, when subsequently heated at 35° to 40° C. for 15 minutes, a J-aggregate of the photomerocyane is formed in very stabilized form. When the recording medium is irradiated with light of wavelength of visible spectrum, the color is bleached with the information consequently recorded. The optical recording medium herein disclosed is rewritable and can retain the recorded information for 5,000 hours or more.

2 Claims, 1 Drawing Sheet

OPTICAL RECORDING MEDIUM

This application is a continuation of application Ser. No. 790,969, filed Oct. 24, 1985, now abandoned.

BACKGROUND OF THE INVENTION

The present invention relates to an optical recording medium utilizing photochromic dye for the optical recording and/or reproduction of information.

As one of the rewritable optical recording media, there is known an optical recording medium utilizing photochromic dye. This known optical recording medium comprises a transparent substrate in the form of, for example, a disc having one surface coated with photochromic dye. When recording information, a laser beam of wavelength λ1 is, while the tracking is effected, irradiated onto the recording medium, then rotated in one direction, so that the information can be stored on a spiral track as a series of spots at which photochromic reaction takes place to transform a colorless state to a colored state having an absorption band centered in the visible wavelength λ2. The information readout from the optical recording medium is carried out by irradiating the recording medium with a less intense laser beam of wavelength λ2 so as to pass through the series of the spots on the spiral track and then detecting, by the use of a photodetector system, absorption of the wavelength λ2 from the change in intensity of light transmitted through the recording medium. Where the recording medium is irradiated with an intense laser beam of wavelength λ2 in the same manner as in the recording process, the series of the spots storing the information can be erased with the photochromic dye consequently transforming from the colored state to the original, colorless state.

However, colored isomers of the photochromic dye are generally unstable and are susceptible to the natural bleaching from the colored state back to the colorless state even when placed in the dark, and therefore, it has long been considered difficult to realize an optical recording medium capable of retaining the stored information for a prolonged period of time.

SUMMARY OF THE INVENTION

The present invention has been developed with a view to minimizing the occurrence of natural bleaching of the photochromic dye and has for its essential object to provide an improved optical recording medium capable of retaining the stored information for a prolonged period of time.

To this end, an optical recording medium implemented in accordance with the present invention comprises a substrate coated, as a recording layer, with a photochromic dye such as, for example, spiropyrane by the use of an LB film method or a method such as, for example, a spin coating method, wherein a force acts in a horizontal direction relative to the substrate. The optical recording medium is processed by heat-treatment to form an aggregate of the photochromic dye for stabilization.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
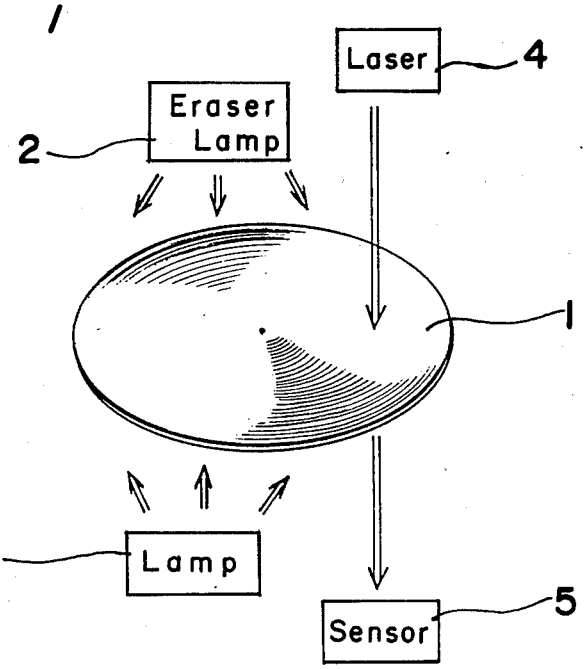
FIG. 1 is a schematic diagram showing an optical recording apparatus with which an optical recording medium according to the present invention can work.

The organic dye may often associate by the effect of surroundings to form an aggregate having a few molecules accompanied by the change in property, such as, for example, stability and spectral characteristic. The type of aggregate currently known in the art includes a dimer, a J-aggregate, an H-aggregate and a complex thereof and, of these aggregates, a so-called J-aggregate can be more effectively utilized in the practice of the present invention. In general, when the dye associates to form the J-aggregate, the visible absorption spectrum becomes sensitive and shifts toward a region of long wavelength. Therefore, by observing this phenomenon, the association of the dye to form the J-aggregate can be identified.

On the other hand, the photochromic dye includes, for example, spiropyrane, azobenzene, fulgide, indigo, thioindigo, and triarylmethane, all of which may, depending on the substituent group and the surroundings, associate to form one of the above described aggregates. Of them, spiropyrane has been found susceptible to the association. Spiropyrane is normally colorless and, when irradiated with ultraviolet light, forms photomerocyanine, violet in color and having a maximum absorption peak in the region adjacent the ultraviolet wavelength. However, photomerocyanine is unstable and is susceptible to reversing to the original spiropyrane with irradiation of visible light.

The inventors of the present invention have found that photomerocyanine, when subjected to a thermal reaction, associates to form the J-aggregate and is therefore stabilized securely. In order for the photomerocyanine to exhibit such an effect as described hereinabove, three factors are involved; the molecular structure of the photochromic dye, the method of making the recording layer, and the recording process. Examples of spiropyrane derivatives which can be particularly effectively utilized in the practice of the present invention generally have a molecular structure expressed by the following chemical formula:

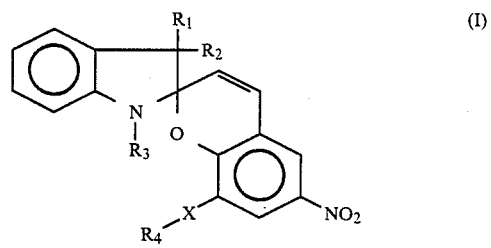

(I)

wherein each of $R_1$ and $R_2$ is an alkyl group having at least one carbon atom, preferably a methyl group; $R_3$ is an alkyl group having at least 10, preferably at least 14, carbon atoms, preferably an octadecyl group having 18 carbon atoms; X is a single bond or a divalent group of each of the following formulas, $$-C_nH_{2n}OCO-\text{(II)}$$

—$C_nH_{2n}COO$—(III)
—$C_nH_{2n}NHCO$—(IV)
—$C_nH_{2n}CONH$—(V)
—$C_nH_{2n}O$—(VI)

in which n is zero or a positive integer, preferably one or two; and $R_4$ is an alkyl group having at least one, preferably at least 8, and more preferably 21, carbon atoms. Of the spiropyrane derivatives (I), the one wherein the substituent group $R_1$ has at least 10 carbon atoms can be effectively utilized in the practice of the present invention.

For making the recording layer on the substrate, any of the following methods wherein a horizontal force relative to one surface of the substrate acts can be employed in the practice of the present invention.

Langmuir-Blodgett film method (LB film method),
Spin coating method,
Air doctor coating method,
Blade coating method,
Rod coating method,
Knife coating method, and
Squeeze coating method.

Of these methods, the spin coating method and LB film method are preferable. They have, however, been found that the spiropyrane derivative contained in the recording layer so formed according to any one of the above described methods formed photomerocyanine when irradiated with the UV and, thereafter, formed a J-aggregate of the photomercoyanine when subsequently heated. Although the mechanism of formation of the aggregate has not yet been revealed, it is supposed that employment of any one of the above described methods has brought about such an orientation of the spiropyrane molecules in the recording layer as enabling the spiropyrane derivative to readily form the aggregate. It is to be noted that, for the purpose of the present invention, a term "preaggregate" is hereinafter employed to denote the type of aggregate which, when treated externally, readily forms the intended aggregate of the photochromic dye.

Hereinafter, the present invention will be described by way of examples which are not intended to limit the scope of the present invention, but are only for the purpose of illustration.

EXAMPLE 1

The spiropyrane derivative (SP 1822) manufactured in a manner described below has a molecular structure expressed by the following chemical formula:

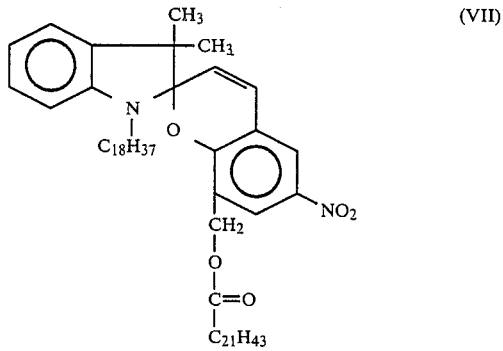
(VII)

The spiropyrane derivative of formula (VII) was prepared in the following manner.

(a) A mixture of 0.5 mol of 2,3,3-trimethylindolenine and 0.5 mol of iodooctadecane was refluxed in chloroform for 30 hours and was then washed with diethyl ether to produce 1-octadecyl-2,3,3-trimethylindolenium iodide as a red solid compound. This red solid compound was treated with a concentrated solution of potassium hydroxide and extracted with diethyl ether. When the resultant extract was subsequently dried, a red liquid was obtained which is 1-octedecyl-3,3-dimethyl-2-methyleneindoline.

(b) 0.5 mol of 5-nitrosalicylaldehyde was dissolved in 1 liter of chloromethylmethyl ether and was, while being cooled on an ice bath, added with 2.5 mol of ground aluminum chloride. After refluxing for 80 hours, the resultant solution was added with ice and, as a result, a brown precipitate was formed in the ice water. When the precipitate was recrystallized from 10 liters of n-hexane, a colorless acicular crystal was obtained which is 3-chloromethyl-5-nitrosalicylaldehyde.

(c) A mixture of 0.1 mol of the crystalline 3-chloromethyl-5-nitrosalicylaldehyde prepared in (b) above and 0.15 mol of behenoic acid silver salt was refluxed in toluene for 40 hours, and the resultant hot solution was filtered and then cooled, leaving a colorless crystal which is 3-stearoyloxymethyl-5-nitorsalicylaldehyde.

(d) Th red liquid prepared in (a) above and the colorless acicular crystal prepared in (b) above, each 0.05 mol, were refluxed in methylethylketone for 20 hours to yield a dark blue liquid containing the spiropyrane derivative of formula (VII). By the use of column chromatography (wherein the carrier used was silicagel and the developing solvent used was a mixture of carbon tetrachloride and chloroform in a volume ratio of 10:3) or preferably by recrystallizing from a mixed solvent of acetonitrile and tetrahydrofuran in a volume ratio of 3:1, the dark blue liquid was purified. The melting point of the resultant spiropyrane derivative of formula (VII) was 52.8° to 53.2° C. The chemical structure of the spiropyrane derivative of formula (VII) could be identified by $^{13}C$ NMR. The result thereof is tabulated in Table 1.

TABLE 1

| δ (ppm) | style | assignment | carbon number |
|---|---|---|---|
| 173.1 | singlet | spiro | 1 |
| 167.9 | | carbonyl | 1 |
| 156.9 | | aromatic | 6 |
| 146.8 | | | |
| 140.5 | | | |
| 135.7 | | | |
| 123.6 | | | |
| 118.5 | | | |
| 127.9 | doublet | aromatic | 6 |
| 127.7 | | olefinic | 2 |
| 124.8 | | | |
| 122.8 | | | |
| 121.5 | | | |
| 119.4 | | | |
| 107.4 | | | |
| 106.7 | | | |
| 77.0 | triplet | N— | 1 |
| 55.9 | | 8- | 1 |
| 43.7 | | α-methylene | 1 |
| 52.5 | singlet | 3- | 1 |
| 34.2 | triplet | 3-methyl | 2 |
| —22.7 | | long alkyl methylene | 35 |
| 19.7 | qualtet | long alkyl methyl | 6 |
| 14.1 | | | |

Using the spiropyrane derivative of formula (VII), the optical recording medium of the present invention was manufactured in the following manner according to the LB film method. At the outset, the subphase controlled to 18° C. and adjusted to pH 7.2 was filled in a Langmuir type LB film forming apparatus having a trough of 1,000 mm×500 mm in size. 700 μl of a chloroform solution containing 1 mmol/l of the spiropyrane derivative of formula (VII) and 2 mmol/l of n-octadecane was spread over the level surface of the subphase to form a monomolecular layer of the spiropyrane derivative of formula (VII). The film pressure was automatically controlled to 20 mN/m.

The substrate in the form of a glass disc, 3.5 inches in diameter, having its opposite surfaces rendered hydrophobic by immersing it for 30 minutes in a 10 vol.% solution of trimethylchlorosilane in toluene, was moved up and down three times in a direction perpendicular to the monomolecular film of spiropyrane to form the LB film (12 layers of Y film) of the spiropyrane derivative of formula (VII) which is the recording layer referred to hereinbefore.

The optical recording medium manufactured in the manner as hereinabove described can be operated by the use of an optical write/read system, the construction and operation of which will now be described with particular reference to FIG. 1.

The optical recording medium shown in the form of an information carrier disc 1 having at least one surface formed with the recording layer of the spiropyrane derivative of formula (VII) and is supported for rotation in one direction about its center. The optical write/read system includes an eraser lamp 2 capable of emitting UV light of 350 nm in wavelength and an aggregate forming lamp 3 comprised of an infrared lamp, said lamps 2 and 3 being arranged on respective sides of the information carrier disc 1, that is, the optical recording medium according to the present invention. The system also includes a write/read laser 4 and a photodetector 5, both supported on respective sides of the information carrier disc 1 for movement in synchronism with each other in a direction radially of the information carrier disc 1. The write/read laser 4 is of a type capable of emitting a laser beam 618 nm in wavelength with its output switchable between 500 mJ/cm$^2$ and 5 mJ/cm$^2$ one at a time. The photodetector 5 is operable to detect the change in intensity of the laser beam which has passed through the spiral track on the information carrier 1.

The system of the above described construction operates in the following manner.

(1) Initialization of Carrier Disc

Figure 2:
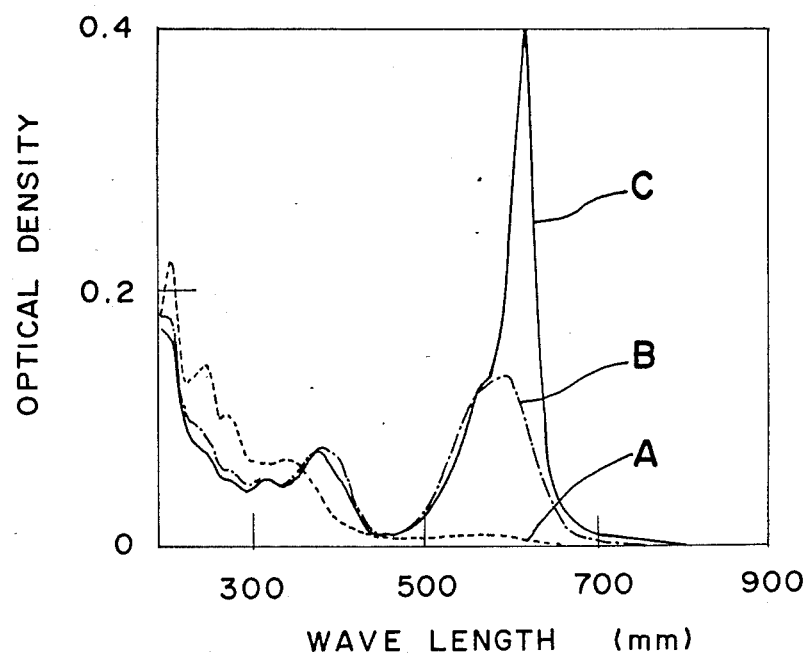
FIG. 2 is a graph illustrating an absorption spectrum exhibited by a recording layer of the optical recording medium.

The information carrier disc 1 as manufactured was colorless with its absorption spectrum as shown by a curve A in the graph of FIG. 2. When the information carrier disc 1 had been irradiated over the entire surface thereof with the UV light from the eraser lamp 2 for 10 minutes, a violet color was produced. The absorption spectrum of the information carrier disc 1 exhibited at the time it was colored violet is shown by a curve B in the graph of FIG. 2. The absorption peak at about 583 nm is exhibited by the photomerocyanine. When the information carrier disc 1 had been subsequently irradiated with infrared light from the aggregate forming lamp 3 so that the recording layer thereof could have been heated to and maintained at 35° to 40° C. for about 15 minutes, the J-aggregate of the photomerocyanine was formed within the recording layer and, as a result, the information carrier disc 1 was colored blue with its absorption spectrum shown by a curve C in the graph of FIG. 2. The presence of the J-aggregate is evidently indicated by the shift in about 35 nm towards the longer wavelength and the attainment of the half value width of about 30 nm.

In this way, the information carrier disc, that is, the optical recording medium according to the present invention, could be initialized in readiness for the subsequent writing of information on the spiral track.

(2) Information Writing

While the tracking was effected, a laser beam emitted from the laser 4 set at 500 mJ/cm$^2$ was focused on the information carrier disc 1. Areas of the carrier 1 where a series of spots of the laser beam were formed were bleached, indicating that the information was optically recorded. The absorption spectrum of each area of the carrier disc 1 which had been bleached is substantially identical with the curve A shown in FIG. 2, showing the restoration to the original spiropyrane.

(3) Information Readout

While the tracking was effected in the same way as during the information writing, a laser beam emitted from the laser 4 set at 5 mJ/cm$^2$ was focused on the carrier disc 1. The laser beam passing through the carrier disc 1 was detected by the photodetector 5. Since the intensity of light which had passed through each area of the carrier disc 1 exposed to the laser beam during the information writing and, hence, storing bits of the information is generally higher than that through the other, non-exposed areas of the same carrier disc 1, the information stored in the carrier disc 1 could have been reproduced by processing output signals from the photodetector 5.

(4) Erasure and Rewriting

The information recorded (written) on the carrier disc 1 could be erased by the employment of a procedure identical to that used for the initialization. On the other hand, the erased carrier disc could be used for the rewriting of information thereon by the employment of the procedure described at Information Writing.

It is to be noted that, when the carrier disc having the information recorded thereon in the manner as hereinabove described was stored in the dark for 5,000 hours or more, the information thereon was found retained.

Although in the foregoing description the colored state of the information carrier disc has been shown as an initial state and has been described as transformed into the bleached state during the information writing procedure, the present invention may not be limited thereto and can apply to the case where the information carrier assumes a bleached or colorless state when initialized.

EXAMPLE 2

The same substrate as in Example 1 was spin-coated at 500 rpm for 30 seconds with a 5 wt.% solution of the spiropyrane derivative of formula (VII) in toluene to form the recording layer thereon. The information carrier disc so manufactured could be used as in Example 1 and could retain the recorded information in the dark for 5,000 hours or more.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical recording medium capable of information writing and readout by means of a laser beam comprising a recording layer formed thereon, said recording layer containing a J-aggregate, or a preaggregate thereof, of a spiropyrane photochromic dye of the formula

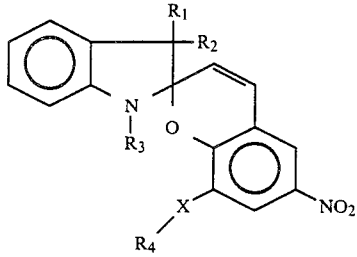

wherein each of $R_1$ and $R_2$ is alkyl having at least one carbon atom, $R_3$ is alkyl having at least 10 carbon atoms, X is a single bond or a group of one of the following formulas
  —$C_nH_{2n}OCO$—
  —$C_nH_{2n}COO$—
  —$C_nH_{2n}NHCO$—
  —$C_nH_{2n}CONH$—
  —$C_nH_{2n}O$—
wherein $n \geqq 0$ and $R_4$ is an alkyl group having at least one carbon atom.

2. An optical recording medium as claimed in claim 1, wherein each of $R_1$ and $R_2$ is a substituent group of the formula: $CH_3$; $R_3$ is a substituent group of the formula: $C_{18}H_{37}$; $R_4$ is a substituent group of the formula: $C_{21}H_{43}$; and X is a substituent group of the formula:

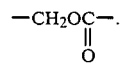

* * * * *